J. A. JEROME.
ROLLING MILL.
APPLICATION FILED APR. 6, 1915.
1,167,567.
Patented Jan. 11, 1916.
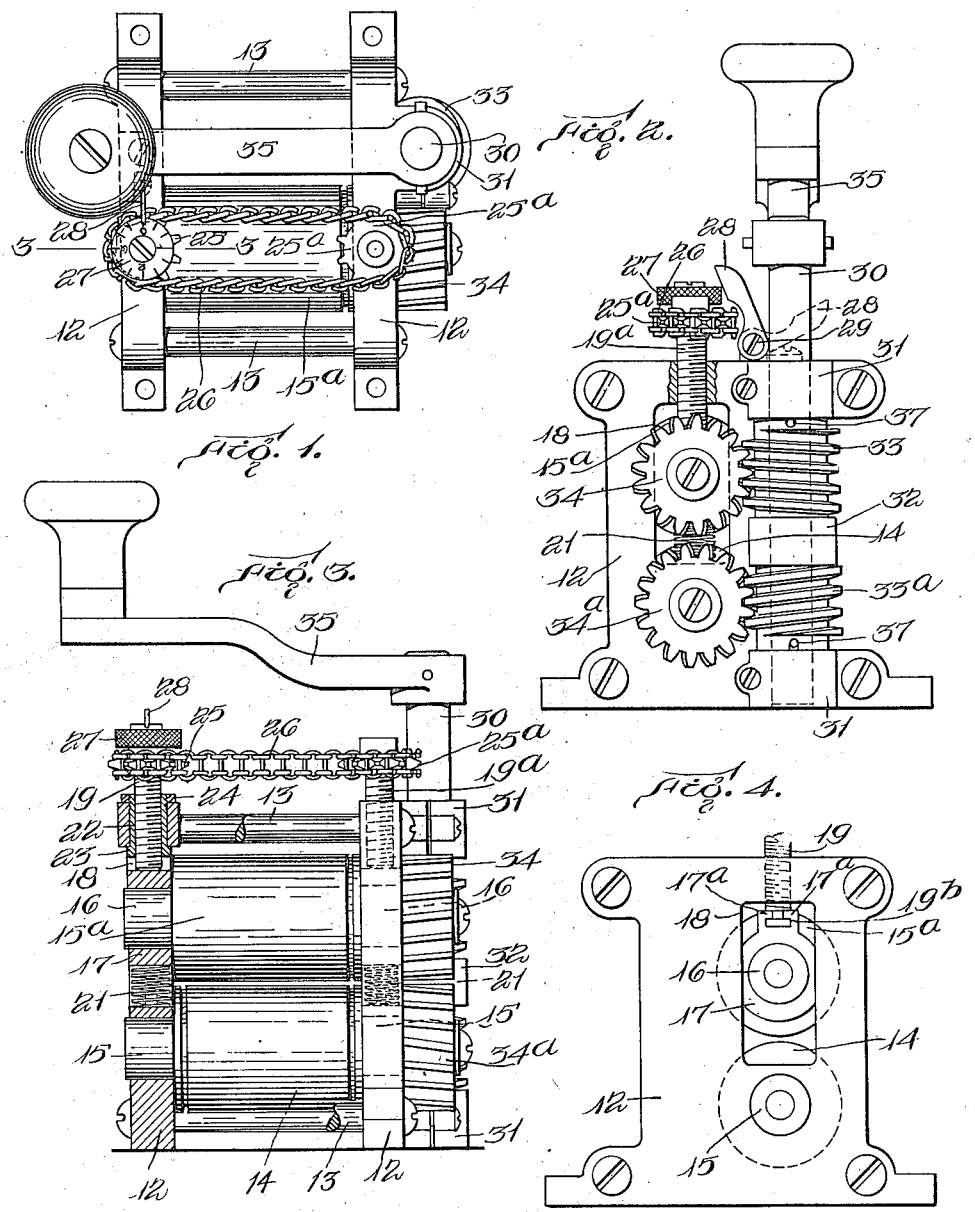
Inventor:
James A. Jerome
by Knight Brown Quinby May
Attorneys.

UNITED STATES PATENT OFFICE.

JAMES A. JEROME, OF MONTPELIER, VERMONT.

ROLLING-MILL.

1,167,567.  Specification of Letters Patent.  Patented Jan. 11, 1916.

Application filed April 6, 1915. Serial No. 19,467.

*To all whom it may concern:*

Be it known that I, JAMES A. JEROME, a citizen of the United States, and resident of Montpelier, in the county of Washington and State of Vermont, have invented certain new and useful Improvements in Rolling-Mills, of which the following is a specification.

This invention relates to a mill for reducing a metal plate or strip by successive passes of the same between rolls which are relatively adjustable to vary the width of the nip of the rolls.

The invention is intended particularly for gradually reducing the thickness of a plate of precious metal, such as gold, to prepare the metal for use by dentists, and for this use is embodied in a mill of relatively small size, the rolls being manually driven.

The invention has for its object to provide simple, durable and compact means for simultaneously rotating the rolls in opposite directions, said means being unaffected by nip-varying adjustments of the rolls, and adapted to utilize to good advantage hand or other power applied to rotate the rolls.

The invention consists in the improvements which I will now proceed to describe and claim.

Of the accompanying drawings forming a part of this specification: Figure 1 represents a top plan view of a mill embodying my invention; Fig. 2 represents an end elevation of the same; Fig. 3 represents a front elevation, parts being shown in section on the plane of line 3—3 of Fig. 1; Fig. 4 represents a fragmentary elevation of the end opposite that shown by Fig. 2, illustrating a modification.

The same reference characters indicate the same or similar parts in all the views.

In the drawings: 12, 12, represent upright spaced-apart frame members, rigidly connected by transverse tie-rods 13.

14 represents a lower roll secured to a shaft 15 the end portions of which are journaled in fixed bearings in the frame.

15ª represents an upper roll secured to a shaft 16, the end portions of which are journaled in movable bearings 17 fitted to slide in vertical guides 18 in the frame. The height of the bearings 17 is determined by two rotary adjusting members 19, 19ª, each of which is a screw-threaded rod or bolt engaged with a threaded orifice in the frame, said members bearing at their lower ends on the bearings 17.

In the preferred embodiment of the invention the adjusting members bear on the bearings 17 without positive engagement therewith, said bearings being pressed upwardly against the adjusting members by springs 21. The adjusting members may however be positively engaged with the bearings by means such as hooked ears 17ª on the bearings, and grooves 19ᵇ in the adjusting members, as shown by Fig. 4, the springs being omitted.

The internally threaded orifice engaging the thread of the adjusting member 19 is preferably formed in a bushing 22 inserted in a socket formed for its reception in one, of the frame members 12, said bushing having a head 23 bearing on the under side of a portion of said frame member, and a nut 24 engaged with an external thread on the upper end of the bushing and bearing on the upper edge of said frame member, as shown by Fig. 3.

The internally threaded orifice engaging the thread of the adjusting member 19ª may be formed directly in the frame, as shown by Fig. 2. To the adjusting members are attached sprocket wheels 25, 25ª, which are connected by a sprocket chain 26 so that the members 19, 19ª, are rotated in unison to simultaneously adjust the bearings of the upper roll. The member 19 is provided with a circular handle or knob 27, having a knurled periphery enabling it to be conveniently rotated. The flat upper side of said knob is graduated and inscribed as shown by Fig. 1, to form a part of a registering device coöperating with a pointer 28 supported by the frame, in indicating the width of the nip of the rolls. Said pointer is preferably pivoted at 29 to an ear on the frame, and is adapted to be swung backwardly out of the way, as indicated by dotted lines (Fig. 2).

The mechanism for simultaneously rotating the rolls in opposite directions is adapted to advantageously apply power to the rolls and is unaffected by adjustments of the upper roll, said mechanism being preferably organized as follows: 30 represents a vertical shaft journaled in upper and lower bearings 31 and an intermediate bearing 32 on one of the frame members 12. To said shaft are secured two worms 33, 33ª, of opposite inclination, one adjacent to the axis of the upper roll and the other to the axis of the lower roll. To the shaft of the upper roll is attached a worm gear 34 formed to mesh with the convolutions of the worm 33, and to the shaft of the lower roll is attached a worm gear 34ᵃ formed to mesh with the convolutions of the worm 33ᵃ. In a hand-operated machine the shaft 30 may be conveniently rotated by a crank 35 having a relatively long arm.

The described invention enables the muscular force of the operator to easily supply all the power required to reduce the thickness of a gold plate passed between the rolls. Said mechanism is not affected by adjustments of the upper roll, the gear 34 of that roll turning or rolling against the corresponding worm 33 while the upper roll is being adjusted and the operative engagement of said gear and worm remaining unchanged. It is obvious that the shaft 30 may be rotated by power if desired, and that the mill may be of any desired size. The worms 33 and 33ᵃ may be secured to the shaft 30 by any suitable means, such as pins 37 driven through orifices in the hubs of said worms and orifices in the shaft, the worms being placed between the bearings 31 and 32, and the shaft being then inserted in the worm hubs and bearings, and secured by the pins. Provision is thus made for conveniently assembling the worms and shaft.

Having described my invention, I claim:

1. A rolling mill comprising spaced-apart frame members having fixed bearings and movable bearings, rolls journaled in said bearings, means for adjusting the movable bearings and the roll carried thereby to vary the width of the nip of the rolls, and mechanism for simultaneously rotating the rolls in opposite directions, said mechanism including a single operating shaft, arranged at right angles with the axes of the rolls, and connections between said shaft and the rolls, having provisions for imparting rotary movement from the shaft to the rolls when the adjustable roll is in any position to which it may be adjusted.

2. A rolling mill comprising spaced-apart frame members having fixed bearings and movable bearings, rolls journaled in said bearings, means for adjusting the movable bearings and the roll carried thereby to vary the width of the nip of the rolls, and mechanism for simultaneously rotating the rolls in opposite directions, said mechanism including a single operating shaft arranged at right angles with the axes of the rolls and having two worms of opposite inclination and corresponding worm gears attached to the respective rolls, and meshing with said worms, the gear of the adjustable roll being adapted to roll in contact with the accompanying worm when said roll is being adjusted.

3. A rolling mill comprising spaced-apart frame members having fixed bearings and movable bearings, rolls journaled in said bearings, means for adjusting the movable bearings and the roll carried thereby to vary the width of the nip of the rolls, and mechanism for simultaneously rotating the rolls in opposite directions, said mechanism including a single operating shaft arranged at right angles with the axes of the rolls and having two worms of opposite inclination and corresponding worm gears attached to the respective rolls, and meshing with said worms, one of said frame members being provided with upper and lower shaft bearings and an intermediate shaft bearing, and the worms being attached to the shaft between said bearings.

In testimony whereof I have affixed my signature, in presence of two witnesses.

JAMES A. JEROME.

Witnesses:
 LUTHER P. DOEG,
 LEVI G. DUKE.